Figure 1:
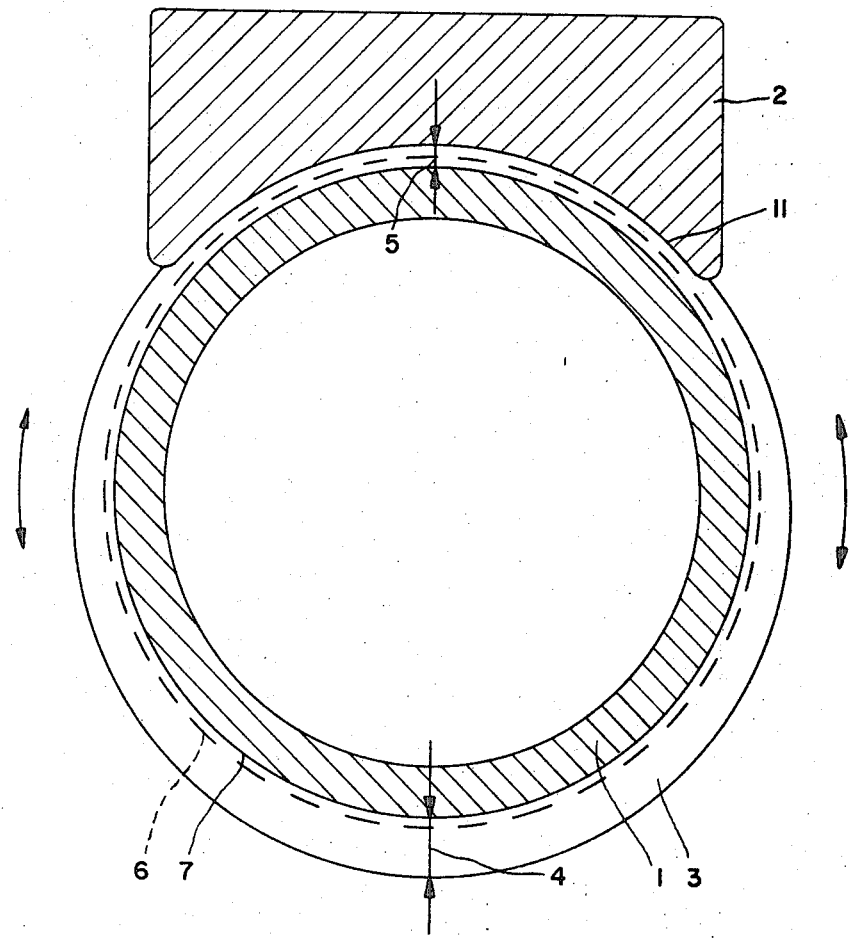

United States Patent [19]
Hallerback

[11] 3,809,445
[45] May 7, 1974

[54] BEARING UNIT
[75] Inventor: Stig Lennart Hallerback, Blodboksgatan, Sweden
[73] Assignee: SKF Industrial Trading and Development Company B.V., Overtoom, Amsterdam-W Netherlands
[22] Filed: Oct. 30, 1972
[21] Appl. No.: 302,174

[30] Foreign Application Priority Data
Oct. 25, 1971 Netherlands ............... 7114660

[52] U.S. Cl. .................. 308/184, 308/236
[51] Int. Cl. ............ F16c 33/30, F16c 27/00
[58] Field of Search .............. 308/184, 236

[56] References Cited
UNITED STATES PATENTS
977,692   12/1910   Zohn .................. 308/184 R
2,653,063   9/1953   Arndt .................. 308/184 R Primary Examiner—Charles J. Myhre
Assistant Examiner—Frank Susko
Attorney, Agent, or Firm—Daniel M. Rosen

[57] ABSTRACT

In the roller bearing having a outer race, one or more rings are provided on the outside surface of the outer race, perpendicular to the central axis of the bearing. The rings are made of an elastic material, such as rubber, and each run in the contact surface between the seat and the outer race in a groove or notch in the surface-seat. An open space is provided on both sides in the groove in axial direction, while, at least for part of the outside surface of the outer race, the distance in the contact surface between the part of the outside surface about which the elastic ring fits and the bottom of the groove is smaller than the radial thickness of a ring, such that the surface of an axial cross section through a ring is at most equal to the surface of the space defined by the sides of the groove and by the outer race.

18 Claims, 2 Drawing Figures

PATENTED MAY 7 1974 3,809,445

BEARING UNIT

The invention relates to a bearing unit consisting of a roller bearing with an inner and an outer race, between which there are one or more rows of roller elements, and with a seat for the outer race, the outside surface of the outer race having the form of a circular cylinder about which the seat fits between two generatrices, and the contact surfaces of seat and outer race being mobile with respect to each other only in the direction perpendicular to the central axis of the bearing.

Such bearing units are known in many types. They are used, for example, for wheels of rolling stock. According to these known bearings, generally two rows of cylindrical roller elements are applied, while the outer surface of the outer ring of such bearings supports a saddle by means of which the weight of the vehicle or of a part thereof is carried. The contact surfaces of the saddle and outer race are so adjusted to each other than a maximum of friction between the two surfaces exists, while the dimensions are such that the shocks received by the wheels during running do not result in fracture.

Disadvantage of these known bearing units are however that, despite the high friction between the contact surfaces of the saddle and the outer race, said surfaces move with respect to each other when subjected to violent shocks.

It is the object of the present invention to avoid the foregoing disadvantage.

In accordance with the present invention, one or more rings are provided on the outside surface of the outer race, perpendicular to the central axis of the bearing. The rings are made of an elastic material, such as rubber, and each run in the contact surface between the seat and the outer race in a groove or notch in the surface-seat. An open space is provided on both sides in the groove in axial direction, while, at least for part of the outside surface of the outer race, the distance in the contact surface between the part of the outside surface about which the elastic ring fits and the bottom of the groove is smaller than the radial thickness of a ring, such that the surface of an axial cross section through a ring is at most equal to the surface of the space defined by the sides of the groove and by the outer race.

In the bearing unit according to the invention, the elastic ring lies with its thin portion in the contact surface, so that compression of the ring-material stimulates a certain friction between the ring and the contact surface, i.e., the bottom of the groove. If an additional friction is not sufficient for keeping the two contact surfaces fixed to each other, the result will be a mutual displacement (rotation of the outer race). The elastic ring will rotate along with the outer race, causing a thicker ring portion to be carried between the two contact surfaces, resulting in frictional-increase. Such a process can take place several times in succession, until the additional friction caused by the rubber ring is eventually so high that the two contact surfaces will be fixed with respect to each other. The result is thus that the friction in the contact surface has been automatically adapted to the external circumstances.

The elastic ring can be an O-ring fitted on the outer race. When the surface of the cross section through the O-ring is too large as compared to the space available on both sides in the groove, the rubber cannot escape when the ring is stressed and compressed, and an undesired stress on the outer race originates. Accordingly, there is a limit for the ring-thickness.

A satisfactory operation of the elastic ring will be attained by a certain minimum and maximum thickness. The minimum thickness is selected such that whatever the position of the ring with respect to the contact surface of the seat, at least some friction will be produced by the ring. The maximum thickness is limited by the requirement that the prevailing situation in the contact surface is always that the force transmitted by the seat is applied to the outer race of the bearing centralling above a row of roller elements and, in case of several rows, symmetrically with respect thereto. In other words: under no circumstances can the seat rest substantially upon the compressed elastic ring. This means that the maximum thickness of the ring is determined by the compressed state of the material and by the space which is available on both sides of the ring for receiving ring-material that has been forced aside, i.e., by the width of the groove and the seat-surface.

It is furthermore necessary to bear in mind a difficulty that occurs in practice, i.e., the fact that the depth of the recesses or grooves in which the elastic ring is placed is not equal, due for example to irregularities during casting. The present invention avoids the requirement of selecting, for each groove, a ring adapted thereto.

It is, of course, possible to use one elastic ring as well as several rings.

The ring-material must satisfy specific demands with respect to resilience, friction characteristics and heat resistance. In this regard, for example, excellent performance is obtained from a rubber known as EPDM-70.

If the bearing unit according to the invention is used for wheels that can rotate in either direction, it is an advantage to reach rapidly, i.e., without any great rotation of the outer race with respect to the seat, the situation in which the outer race and the seat are fixed with respect to each other.

This situation can be attained in accordance with the invention by gradual distance-changes between the outside surface of the ring and the contact surface of the outer race. A self-adjusting ring is thus obtained.

The bearing unit is preferably designed such that the position between the outside surface of the ring and the contact surface of the outer race presents two maximums: one at each end of the groove. The adjustment then is short. The position of these maximums limits the rotation required for fixation.

The elastic ring can be fitted in different manners on the outside surface of the outer race. In accordance with the invention, the elastic ring can have an inside diameter which is smaller than the outside diameter of the outer ring on the part of the surface surrounded by the ring. Another possibility, however, is that the ring about the surface of the outer race is vulcanized.

According to the invention, the ring can also be designed with a circular cylindrical inside surface, in such a way that, in a cross section through the ring perpendicular to the central axis of the bearing, the distance between the center and the outside presents gradual changes. The ring accordingly becomes gradually thicker, thus providing the desired fixation.

In order to retain the ring in its place, it can be positioned in a groove. According to the invention, however, the ring can also have a radial thickness which is consistently the same, and can be placed in a groove about part of the outer race, with the depth of the groove gradually varying from a minimum to a maximum depth. In this embodiment, the fixation is determined by the variable depth of the groove.

A bearing unit constructed in accordance with the invention is advantageously applied to wheels of rolling stock, where the saddle is subjected to high stresses and where the wheels are liable to violent shocks. A preferred embodiment of such a bearing unit according to the invention is characterized in that the bearing has two rows of roller elements and in that the elastic ring is arranged about the part of the outside surface of the outer race situated between the surfaces on the inside of which the roller elements are provided.

Figure 2:
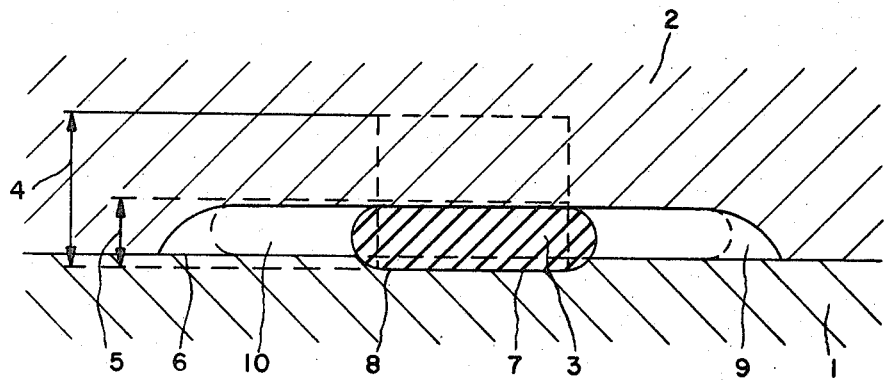

The foregoing description of the invention will become more apparent from the following more detailed descriptions and appended drawings wherein:

FIG. 1 represents a cross sectional view of a bearing unit in accordance with the invention, shown perpendicular to the axis of the bearing through a set of grooves in the contact surface between the seat and the outer race, and FIG. 2 represents a detail of a cross sectional view perpendicular to the direction of the grooves, in the location where the grooves lie opposite each other in the contact surface.

In FIG. 1, the outer race of the bearing is indicated by 1; the dotted line 6 represents the outside of said race, and 7 represents the bottom of the groove or recess, provided around the ring or race. A portion of the outside surface 6 is in contact with a seat 2; the surface of the seat 2 which is in contact with the outside surface 6 of the outer race 1 here coincides with the surface 6. The numeral 11 indicates the bottom of the groove in the seat 2.

Around the outer race 1, in the groove with bottom 7, an elastic ring 3 is arranged. In the example, the ring 3 is shown with a single minimum thickness 5 and a single maximum thickness 4, which gradually pass into each other as the outer circumference of the ring 3 rotates. The portion of the ring 3 which has a minimum thickness 5 is arranged in the center of the contact surface between the seat 2 and the outer race 1. Since the thickness of the ring 3 increases toward both sides, seen from this center of the contact surface, and since the maximum thickness 4 is at least equal to the sum of the depths of the two grooves with bottoms 7 and 11, the elastic ring will be compressed between seat and outer race, and a certain friction will be the result thereof.

Now when the outer race 1 starts rotating underneath the seat 2 under the action of external forces, an ever-increasing amount of the elastic material of the elastic ring 3 will come between the seat 2 and the outer race 1 on one side of the seat 2. As a result, the friction eventually becomes so high that, upon continued rotation of a wheel attached to the bearing, no further motion of the outer race 1 with respect to the seat 2 will take place.

The same result, in the same manner, applies to wheel rotation in the other direction.

FIG. 2 indicates the manner wherein the elastic ring 3, arranged in the groove 8, is fixed between the seat 2 and the outer race 1. The minimum thickness 5 of the ring 3, measured in the nonstressed situation, results after the fixation between the seat 2 and the outer race 1 in a deformation of the ring as shown. The portion of the ring which in the nonstressed situation has the maximum thickness 4, will upon having been fixed between the parts 1 and 2, expand to a shape as indicated by the dashed section 10.

The capacity of the groove 9, on both sides of the groove 8, will have to be at least large enough for the material of the compressed elastic ring 3 which has been forced aside (as indicated by the reference numeral 10) to be received therein, so as to prevent the elastic ring from serving as a support between the seat 2 and the outer race 1, as a result of which the contact surface of the seat 2 and the outer race 1 on both sides of the gutters --and situated above the rows of roller elements of the bearing-- would no longer be equally stressed.

It will be obvious that further variations and alternatives of the foregoing arrangement may be employed in accordance with the skill of the art, and that the present invention will include all such variations as do not depart from the spirit and scope thereof.

What is claimed is:

1. In combination with a bearing unit support bearing having an outer race, a seat comprising a grooved inner surface adapted to fit said outer race, the outside surface of said outer race having the form of a circular cylinder about which said grooved inner surface of said seat fits, in a contacting manner, the contact surfaces of said grooved inner surface and said outer race being mutually displaceable with respect to each other only in a direction perpendicular to the central axis of said bearing, elastic means encircling the outside surface of said outer race, perpendicular to the central axis of said bearing, said elastic means positioned in the contact surface between said outer race and said grooved inner surface of said seat for inhibiting said mutual displacement with a frictional force increasing in accordance with the degree of said displacement, an open space being provided on both sides of said groove in the axial direction, at least for part of the outside surface of said outer race, the distance in the contact surface between the part of the outside surface of said outer race about which said elastic means fits and the bottom of the groove being smaller than the radial thickness of said elastic means such that the surface of an axial cross section through said elastic meams does not exceed the surface of the space defined by the sides of the groove and by the outer race.

2. The bearing unit of claim 1 wherein said elastic support means is at least one ring of rubber.

3. The bearing unit of claim 1 wherein said elastic support means is a plurality of rings.

4. The bearing unit of claim 3 wherein said rings are made of rubber.

5. The bearing unit according to claim 1, wherein said elastic means has an inside diameter which is smaller than the outside diameter of the outer race in the portion of the surface of said outer race which is surrounded by said elastic means.

6. The bearing unit according to claim 1, wherein said elastic means is a vulcanized rubber ring encircling the surface of the outer race.

7. The bearing unit according to claim 1, wherein the distance between the outside surface of said elastic means and the contact surface of the outer race gradually changes over the outside surface of the outer race.

8. The bearing unit according to claim 7, wherein said distance between the outside surface of said elastic means and the contact surface of the outer race presents two extremes, one at each end of the groove.

9. The bearing unit according to claim 7, wherein said elastic means is a ring with a circular cylindrical inside surface and a cross section through said ring perpendicular to the central axis of said bearing, the distance between the center and the outside presents gradual changes.

10. The bearing unit according to claim 1, wherein said elastic ring is placed in a further groove about said outer race.

11. The bearing unit according to claim 10, wherein said elastic means has a constant radial thickness and is placed in said further groove about a portion of the outer race, in such a way that the depth of said further groove gradually changes from a minimum to a maximum depth.

12. The bearing unit according to claim 1, wherein the bearing comprises two rows of roller elements and that said elastic means is positioned around the part of the outside surface of the outer race which is situated between the surfaces thereof, on the inside of which the roller elements are arranged.

13. In combination with a bearing having an outer race, a bearing support comprising a seat having a grooved inner surface, said outer race positioned in said grooved inner surface of said seat and having mutual displacement relative to said seat in the direction of said groove, elastic means positioned about said outer race and within said groove and compressible from a minimum to a maximum for providing increased friction to oppose said mutual displacement.

14. The bearing support of claim 13 wherein the distance between the outside surface of said elastic means and the contact surface of the outer race gradually changes over the outside surface of the outer race.

15. The bearing support of claim 14 wherein said distance between the outside surface of said elastic means and the contact surface of the outer race presents two extremes, one at each end of the groove.

16. The bearing support of claim 14 wherein said elastic means is a ring with a circular cylindrical inside surface and a cross section through said ring perpendicular to the central axis of said bearing, the distance between the center and the outside presents gradual changes.

17. The bearing support of claim 13 wherein said elastic ring is placed in a further groove about said outer race.

18. The bearing support of claim 17 wherein said elastic means has a constant radial thickness and is placed in said further groove about a portion of the outer race, in such a way that the depth of said further groove gradually changes from a minimum to a maximum depth.

* * * * *